United States Patent
Liao et al.

(10) Patent No.: US 8,675,747 B2
(45) Date of Patent: Mar. 18, 2014

(54) CHANNEL ESTIMATING APPARATUS AND METHOD THEREOF

(75) Inventors: Yi-Ying Liao, Hsinchu Hsien (TW);
Chen-Yi Liu, Hsinchu Hsien (TW);
Tai-Lai Tung, Hsinchu Hsien (TW)

(73) Assignee: MStar Semiconductor, Inc. (TW)

( * ) Notice: Subject to any disclaimer, the term of this patent is extended or adjusted under 35 U.S.C. 154(b) by 499 days.

(21) Appl. No.: 12/769,098

(22) Filed: Apr. 28, 2010

(65) Prior Publication Data

US 2010/0284478 A1 Nov. 11, 2010

Related U.S. Application Data

(60) Provisional application No. 61/176,954, filed on May 11, 2009.

(51) Int. Cl.
*H04L 27/28* (2006.01)

(52) U.S. Cl.
USPC ....................................... 375/260

(58) Field of Classification Search
USPC .......... 370/210, 334; 375/219, 222, 229, 260, 375/267, 287, 299, 295, 316, 346
See application file for complete search history.

(56) References Cited

U.S. PATENT DOCUMENTS

| | | | | |
|---|---|---|---|---|
| 5,796,814 | A * | 8/1998 | Brajal et al. | 375/232 |
| 7,058,134 | B2 * | 6/2006 | Sampath | 375/260 |
| 7,212,595 | B2 * | 5/2007 | Tung et al | 375/350 |
| 2005/0157801 | A1 * | 7/2005 | Gore et al. | 375/260 |
| 2005/0265490 | A1 * | 12/2005 | Sestok et al. | 375/340 |
| 2007/0002728 | A1 * | 1/2007 | Fujii et al. | 370/210 |
| 2007/0217490 | A1 * | 9/2007 | Blake et al. | 375/222 |
| 2008/0192846 | A1 * | 8/2008 | Bjerke et al. | 375/260 |
| 2009/0129493 | A1 * | 5/2009 | Zhang et al. | 375/260 |
| 2009/0285315 | A1 * | 11/2009 | Wu | 375/260 |
| 2011/0026620 | A1 * | 2/2011 | Liao et al. | 375/260 |
| 2011/0096853 | A1 * | 4/2011 | Jayaraman et al. | 375/260 |

* cited by examiner

*Primary Examiner* — Sam K Ahn
*Assistant Examiner* — Shawkat M Ali
(74) *Attorney, Agent, or Firm* — Han IP Corporation

(57) ABSTRACT

A channel estimating technique is applied to an Orthogonal Frequency-Division Multiplexing (OFDM) communication system which receives a plurality of OFDM symbols. In one aspect, a channel estimating method includes performing Inverse Fast Fourier Transform (IFFT) with a second number of sampling points and a phase shift on each of preliminarily estimated frequency-domain channel responses including a first number of response values corresponding to each of the OFDM symbols, so as to obtain a first time-domain channel impulse response corresponding to each of the OFDM symbols, where the first number is lager than the second number. The method also generates a plurality of frequency-domain channel responses corresponding to the OFDM symbols according to the time-domain channel impulse responses.

18 Claims, 9 Drawing Sheets

US 8,675,747 B2

CHANNEL ESTIMATING APPARATUS AND METHOD THEREOF

CROSS REFERENCE TO RELATED PATENT APPLICATIONS

This patent application claims priority from U.S. Provisional Patent Application No. 61/176,954, filed on May 11, 2009, which is hereby incorporated in its entirety by reference.

TECHNICAL FIELD

The present disclosure relates to channel estimation, and more particularly, to a channel estimating method and an apparatus that are applied to an Orthogonal Frequency-Division Multiplexing (OFDM) communication system.

BACKGROUND OF THE PRESENT DISCLOSURE

In a wireless communication system, inter-symbol interference (ISI) between received signals is usually caused by a multi-path fading effect in a radio channel. To remove the ISI, a receiver is provided with an equalizer that needs information of channel impulse response (CIR) to operate, and therefore estimation of the CIR plays a critical part in a mobile radio system.

The OFDM, an important communication technology in the wireless communication field, is capable of increasing a data transmission rate. For example, the OFDM technology is implemented in IEEE 802.11a, which provides a data transmission rate up to 54 Mbps, whereas a data transmission rate is only 11 Mbps in IEEE 802.11b without the OFDM technology. To effectively estimate CIR of an OFDM system to remove ISI between symbols and thus to fully benefit from a high transmission rate of the OFDM system is obviously an important subject. In the OFDM system, estimation of preliminary estimated frequency-domain channel responses H(k) is commonly achieved by a least square difference calculation on a frequency-domain transmitting value and a frequency-domain receiving value of a pilot symbol at a position of each of pilot sub-carriers. A relationship between the frequency-domain transmitting value and the frequency-domain receiving value is represented by $Y(k)=H(k)X(k)+N_k$, where Y(k) represents a signal received by a receiver, X(k) represents a signal received by a transmitter, H(k) represents a frequency-domain channel response, and $N_k$ represents noises. In an OFDM channel, X(k) transmitted via pilot sub-carriers is known, and X(k) transmitted via data sub-carriers is unknown. Accordingly, H(k) corresponding to a pilot symbol is first obtained from $$H(k) = \frac{Y(k)}{X(k)}$$

(i.e., the noises $N_k$ are omitted), and frequency-domain channel impulse responses H(k) corresponding to other data sub-carriers are interpolated according to channel estimation. Therefore, when the frequency-domain channel impulse response H(k) is obtained, X(k) transmitted via the data sub-carriers is calculated as $$X(k) = \frac{Y(k)}{H(k)}.$$

The preliminary estimated frequency-domain channel responses H(k) only comprise calculated values at positions where the frequency k corresponds to pilot sub-carriers, and frequency-domain channel response values corresponding to other data sub-carriers are first defined as 0. That is, in practice, an Inverse Fast Fourier Transform (IFFT) in an OFDM channel estimating apparatus only generates non-zero values at positions of the pilot sub-carriers, and thus the scale of the IFFT calculation may have room for improvement.

Therefore, a channel estimating apparatus and a method thereof are needed to properly adjust sampling points of an IFFT, reduce the scale of the IFFT and maintain a same channel estimating efficiency, thereby reducing circuit costs.

SUMMARY OF THE PRESENT DISCLOSURE

According to an embodiment of the present disclosure, a channel estimating apparatus, applied to an OFDM communication system which receives a plurality of OFDM symbols, comprises an IFFT unit, a windowing unit, a smoothing unit, and an FFT unit. The IFFT unit performs an IFFT with a second number of sampling points on each of preliminary estimated frequency-domain channel responses comprising a first number of response values corresponding to each of the OFDM symbols, so as to generate a plurality of first time-domain channel impulse responses corresponding to the OFDM symbols, wherein the first number is greater than the second number. The windowing unit filters the first time-domain channel impulse responses according to a time-domain window to generate a plurality of second time-domain channel impulse responses corresponding to the OFDM symbols. The smoothing unit smoothes the second time-domain channel impulse responses to generate a plurality of smoothed time-domain channel impulse responses corresponding to the OFDM symbols. The FFT unit performs an FFT with the first number of sampling points on the smoothed time-domain channel impulse responses to generate a plurality of frequency-domain responses corresponding to the OFDM symbols.

According to another embodiment of the present disclosure, a channel estimating method, applied to an OFDM communication system which receives a plurality of OFDM symbols, comprises performing an IFFT with a second number of sampling points and a phase shift on each of preliminary estimated frequency-domain channel responses comprising a first number of response values corresponding to each of the OFDM symbols to generate a first time-domain channel impulse response corresponding to each of the OFDM symbols, wherein the first number is greater than the second number; and, according to the first time-domain channel impulse responses, generating a plurality of frequency-domain channel responses associated with the OFDM symbols.

According to yet another embodiment of the present disclosure, an IFFT unit, used for channel estimation of an OFDM communication system, comprises an IFFT converter and a phase shifter. The IFFT converter performs an IFFT with a second number of sampling points on each of preliminary estimated frequency-domain channel responses comprising a first number of response values to generate IFFT results, wherein the first number is greater than the second number. The phase shifter multiplexer then for performs a phase shift on each of the IFFT results to generate a time-domain channel impulse response.

DETAILED DESCRIPTION OF THE PREFERRED EMBODIMENTS

Figure 1:
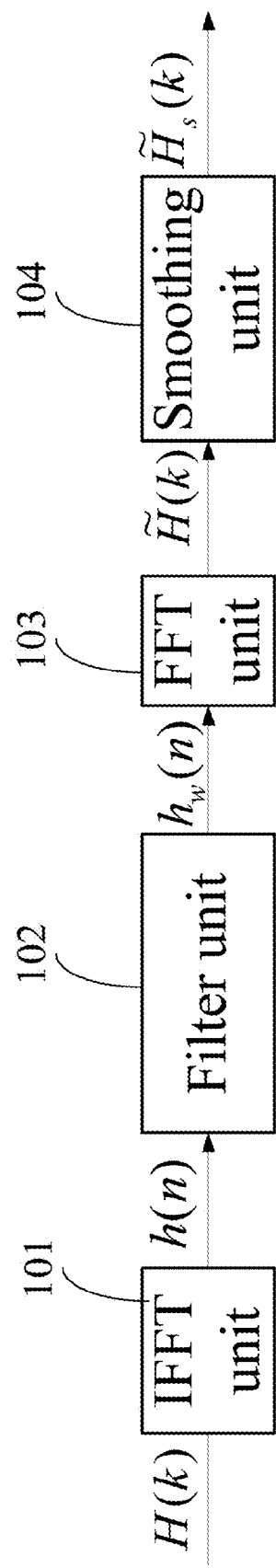
FIG. 1 is a block diagram of an OFDM channel estimating apparatus.
Figure 2:
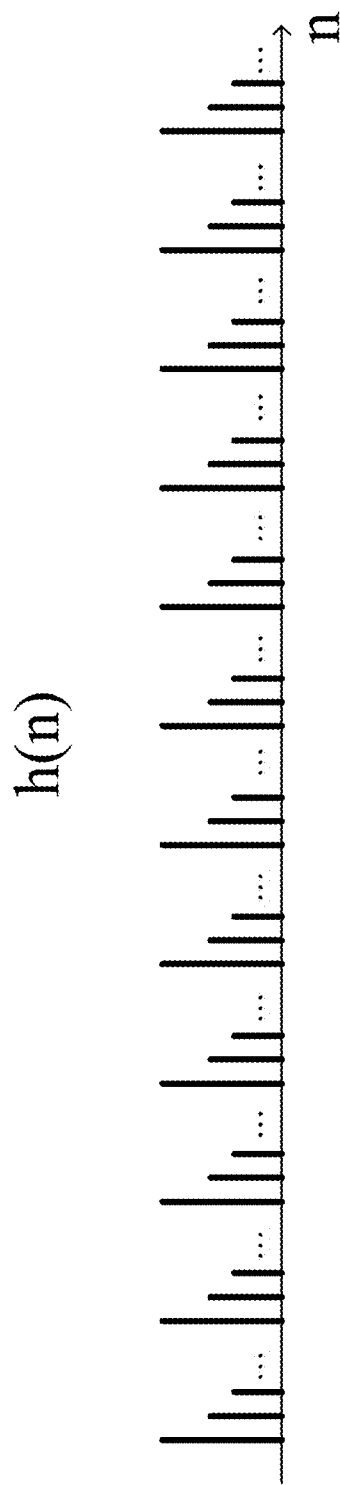
FIG. 2 is a schematic diagram of time-domain channel impulse responses of IFFT results in FIG. 1.

FIG. 1 is a block diagram of an OFDM channel estimating having an 8192-sampling-point IFFT unit 101, a filter unit 102, an 8192-sampling-point FFT unit 103, and a frequency-domain channel response smoothing unit 104. The 8192-sampling-point IFFT unit 101 performs an 8192-sampling-point IFFT on preliminary estimated frequency-domain channel responses H(k) to generate time-domain channel impulse responses $$h(n)\left( h(n) = \sum_{k=0}^{N-1} H(k) \cdot e^{j\frac{2\pi \cdot n \cdot k}{N}} \right),$$

which comprise 8192 time-domain channel impulse response results h(0), h(1), . . . , h(8191), as shown in FIG. 2. Please refer to FIG. 3, it shows a time-frequency distribution of carriers, where "○" represents a pilot symbol, "x" represents a data symbol, the horizontal axis represents a frequency-domain carrier index, and the vertical axis represents a time-domain OFDM symbol index. The 8192-sampling-point IFFT calculation only generates non-zero values at positions corresponding to 576 or 577 with pilot sub-carriers and zero values at other positions, such that scale of the 8192-sampling-point IFFT calculation is too large to result in calculation inefficiency.

The filter unit 102 filters the first time-domain channel impulse responses h(n) according to a threshold and a window length to filter out time-domain channel impulse responses that are beyond the window length and lower than the threshold, in order to generate second time-domain channel impulse responses $h_w(n)$. That means, only the ones of the first time-domain channel impulse responses in the window length and also above the threshold pass the filter unit 102. The 8192-sampling-point FFT unit 103 performs an 8192-sampling-point FFT on the second time-domain channel impulse responses $h_w(n)$ to generate frequency-domain channel responses $\tilde{H}(k)$, wherein k is within a range of 0 to 8191. A frequency-domain channel response smoothing unit 104 performs an averaging calculation according to an OFDM symbol corresponding to each of the frequency-domain channel responses $\tilde{H}(k)$, and the frequency-domain channel responses $\tilde{H}(k)$ corresponding to four groups of OFDM symbols respectively before and after the OFDM symbol, to generate smoothed frequency-domain channel responses $\tilde{H}_s(k)$, e.g., $$\tilde{H}_s(k, l) = \sum_{m=-4}^{4} a_m \cdot \tilde{H}(k, l-m),$$

wherein k represents a carrier number, l represents an OFDM symbol, and $a_m$ represents a weight (e.g., $a_m$ is equal to ⅑ in the averaging calculation).

Figure 4:
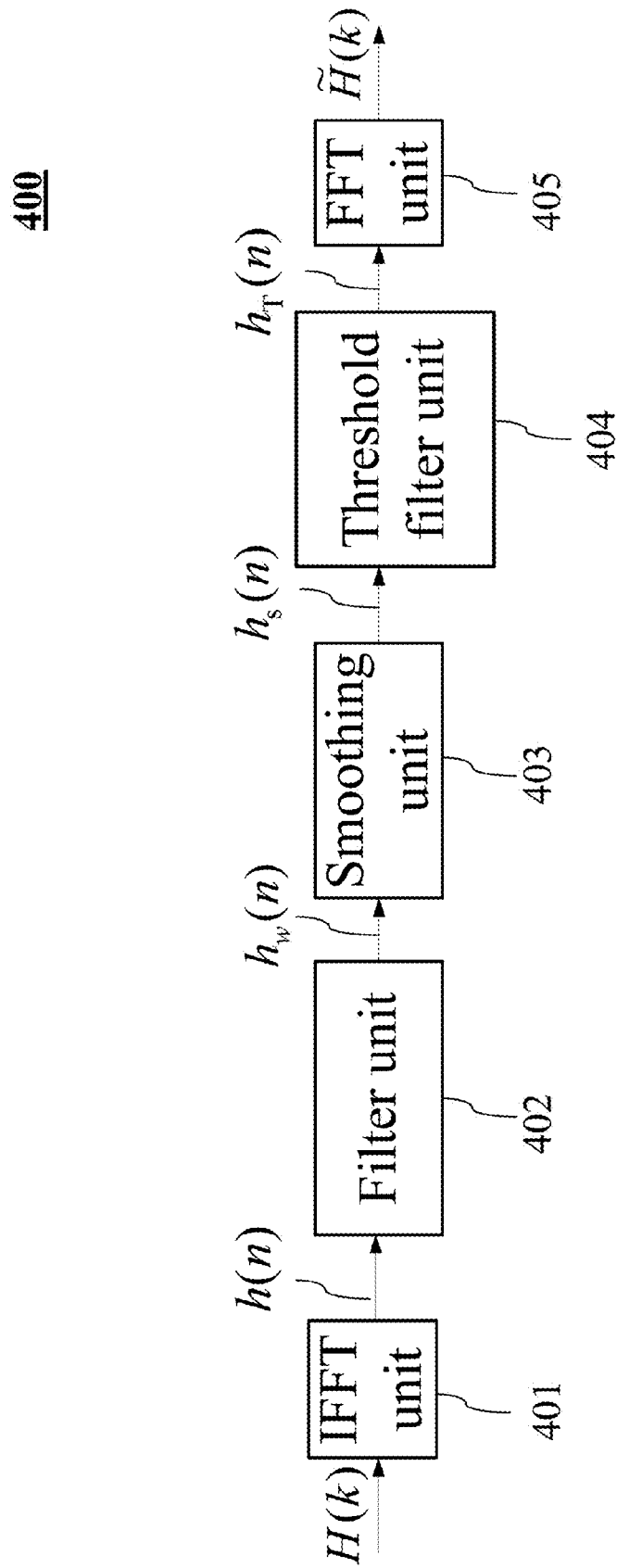
FIG. 4 shows a block diagram of a channel estimating apparatus in accordance with an embodiment of the present disclosure.

FIG. 4 shows a block diagram of a channel estimating apparatus 400 in accordance with an embodiment of the present disclosure. In this embodiment, taking a European Digital Video Broadcasting-Second Generation Terrestrial (DVB-T2) OFDM transmission specification as an example, suppose that each of OFDM channels comprises N (greater than ($K_{max}$+1)) sub-carriers including ($K_{max}$+1) available sub-carriers and N−($K_{max}$+1) unavailable sub-carriers as guard bands. The available sub-carriers include pilot sub-carriers in every D sub-carrier, where every pilot sub-carrier carries a pilot symbol. Other sub-carriers include data sub-carriers where each of them carries a data symbol. In this embodiment, take N equal to 8192, $K_{max}$ equal to 6912 and D equal to 12 as an example. That is, within the 6913 available sub-carriers, there are 576 or 577 pilot sub-carriers for carrying pilot symbols, and 6337 or 6336 data sub-carriers for carrying data symbols. Besides the 6913 available sub-carriers, other 1279 sub-carriers used as guard bands are unavailable in order to avoid inter-symbol interference (ISI).

Referring to FIG. 4, in this embodiment, the channel estimating apparatus 400 comprises an IFFT unit 401, a filter unit 402, a time-domain channel impulse response smoothing unit 403, a threshold filtering unit 404, and an FFT unit 405. The N-point IFFT unit 401 performs an IFFT with a second number of sampling points and a phase shift on preliminary estimated frequency-domain channel responses H(k) comprising a first number (in this example, number N) of response values to generate first time-domain channel impulse responses h(n). In this embodiment, for example, the pilot sub-carriers are located at positions where k is equal to 0, 12, 24, 3456, 4736, 4748, . . . , or 8180, and sub-carriers correspond to positions where k is within a range of 3457 to 4735 are unavailable because they are used as guard bands, the first time-domain channel impulse response h(n) is calculated as:

$$h(n) = \underbrace{\sum_{k=0}^{N-1} H(k) \cdot e^{j\frac{2\pi \cdot n \cdot k}{N}}}_{N-\text{point IFFT calculation}}$$

$$= \sum_{m=0}^{287} H\left(N - \frac{K_{max}}{2} + 12m\right) \cdot e^{j\frac{2\pi \cdot n\left(N - \frac{K_{max}}{2} + 12m\right)}{N}} +$$

$$\sum_{m=288}^{576} H\left(12m - \frac{K_{max}}{2}\right) \cdot e^{j\frac{2\pi \cdot n\left(12m - \frac{K_{max}}{2}\right)}{N}}$$

$$= \sum_{m=0}^{287} H\left(N - \frac{K_{max}}{2} + 12m\right) \cdot e^{j\frac{2\pi \cdot n(3m)}{N/4}} \cdot e^{j\frac{2\pi \cdot n\left(N - \frac{K_{max}}{2}\right)}{N}} +$$

$$\sum_{m=288}^{576} H\left(12m - \frac{K_{max}}{2}\right) \cdot e^{j\frac{2\pi \cdot n(3m)}{N/4}} \cdot e^{j\frac{2\pi \cdot n\left(\frac{K_{max}}{2}\right)}{N}}$$

$$= \underbrace{e^{j\frac{2\pi \cdot n\left(-\frac{K_{max}}{2}\right)}{N}}}_{\text{phase shift}} \cdot \underbrace{\left[\sum_{p=0}^{N/4-1} A(p) \cdot e^{j\frac{2\pi \cdot n \cdot p}{N/4}}\right]}_{\frac{N}{4}-\text{point IFFT calculation}}$$

wherein $$A(p) = \begin{cases} H\left(N - \frac{K_{max}}{2} + 4p\right) & p \% 3 = 0 \boxplus 0 \le p \le 861 \\ H\left(4p - \frac{K_{max}}{2}\right) & p \% 3 = 0 \boxplus 864 \le p \le 1728 \\ 0 & \text{others} \end{cases}$$

Figure 5:
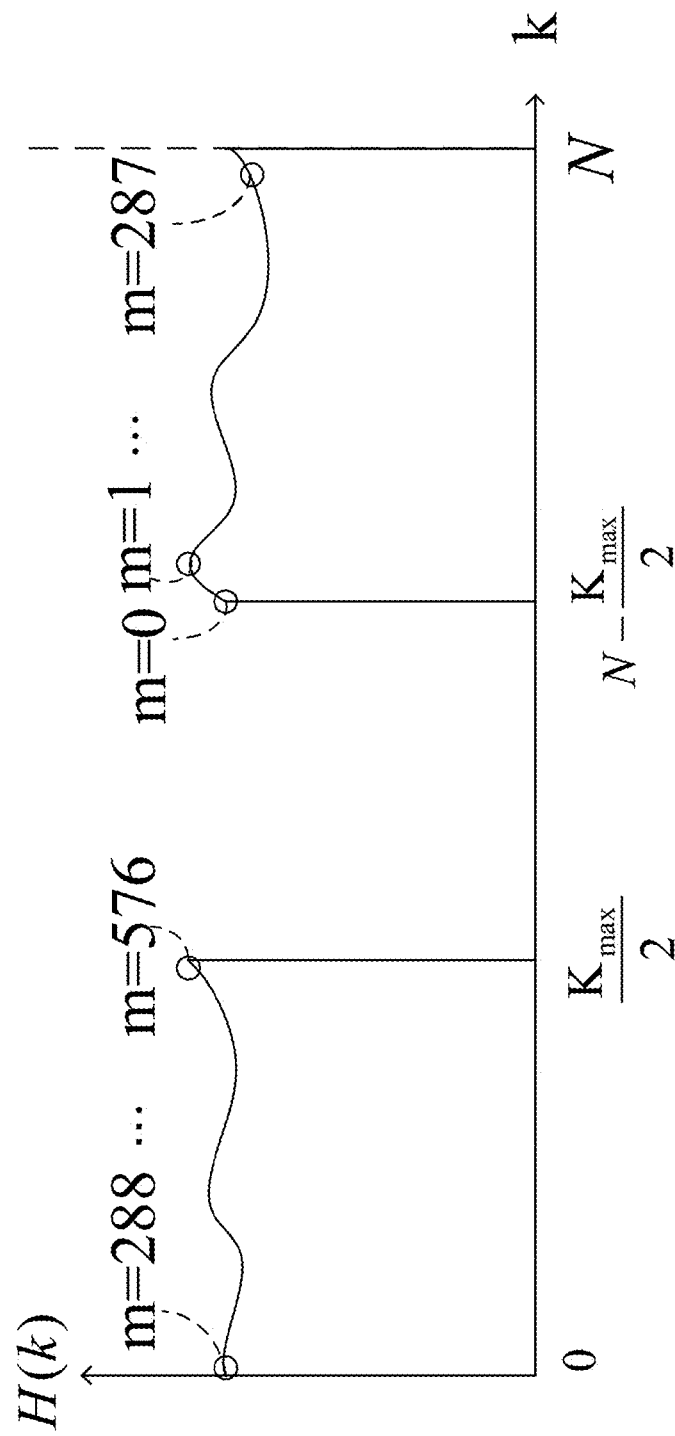
FIG. 5 shows a schematic diagram of an index conversion of preliminary estimated frequency-domain channel responses in accordance with an embodiment of the present disclosure.

FIG. 5 shows a relationship between m and k. From the foregoing equations for example, the IFFT with the first number N of sampling points is simplified to the IFFT with the second number N/4 of sampling points and a phase shift $$e^{j\frac{-\pi \cdot n K_{max}}{N}}$$

in addition. When the pilot sub-carriers are at positions where k is equal to 3, 15, 27, . . . , 3447, 4739, 4751, . . . , or 8183, the first time-domain channel impulse response h(n) is calculated as:

$$h(n) = \underbrace{\sum_{k=0}^{N-1} H(k) \cdot e^{j\frac{2\pi \cdot n \cdot k}{N}}}_{N-\text{point IFFT calculation}}$$

$$= \sum_{m=0}^{287} H\left(N - \frac{K_{max}}{2} + 12m + 3\right) \cdot e^{j\frac{2\pi \cdot n\left(N - \frac{K_{max}}{2} + 12m + 3\right)}{N}} +$$

$$\sum_{m=288}^{575} H\left(12m + 3 - \frac{K_{max}}{2}\right) \cdot e^{j\frac{2\pi \cdot n\left(12m - \frac{K_{max}}{2}\right)}{N}}$$

$$= \sum_{m=0}^{287} H\left(N - \frac{K_{max}}{2} + 12m + 3\right) \cdot e^{j\frac{2\pi \cdot n(3m)}{N/4}} \cdot e^{j\frac{2\pi \cdot n \cdot 3}{N}} \cdot e^{j\frac{2\pi \cdot n\left(N - \frac{K_{max}}{2}\right)}{N}} +$$

$$\sum_{m=288}^{575} H\left(12m + 3 - \frac{K_{max}}{2}\right) \cdot e^{j\frac{2\pi \cdot n(3m)}{N/4}} \cdot e^{j\frac{2\pi \cdot n \cdot 3}{N}} \cdot e^{j\frac{2\pi \cdot n\left(\frac{K_{max}}{2}\right)}{N}}$$

$$= \underbrace{e^{j\frac{2\pi \cdot n \cdot 3}{N}} \cdot e^{j\frac{2\pi \cdot n\left(-\frac{K_{max}}{2}\right)}{N}}}_{\text{phase shift}} \cdot \underbrace{\left[\sum_{p=0}^{N/4-1} B(p) \cdot e^{j\frac{2\pi \cdot n \cdot p}{N/4}}\right]}_{\frac{N}{4}-\text{point IFFT calculation}}$$

wherein $$B(p) = \begin{cases} H\left(N - \frac{K_{max}}{2} + 4p + 3\right) & p \% 3 = 0 \boxplus 0 \le p \le 861 \\ H\left(4p + 3 - \frac{K_{max}}{2}\right) & p \% 3 = 0 \boxplus 864 \le p \le 1725 \\ 0 & \text{others} \end{cases}$$

Figure 3:
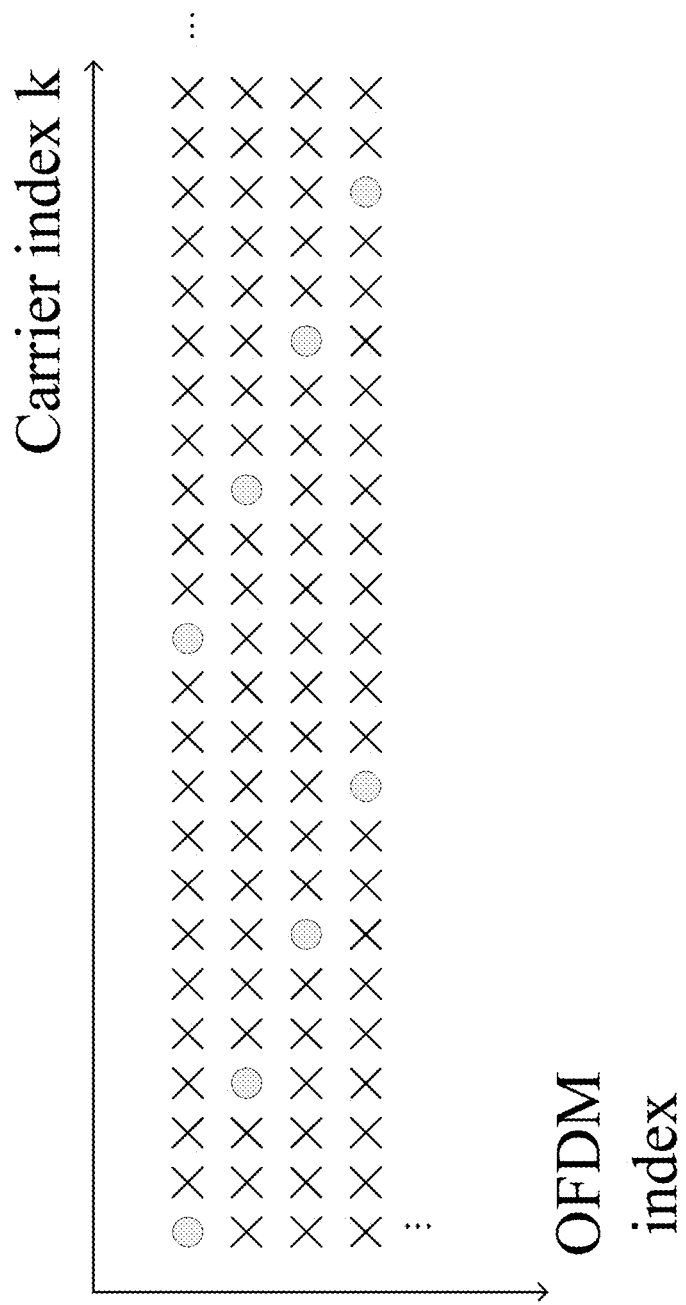
FIG. 3 shows a schematic diagram of a time-frequency distribution of OFDM carriers.

Likewise, the IFFT calculation with the first number N of sampling points is simplified to the IFFT calculation with the second number N/4 of sampling points and a phase shift $$e^{j\frac{2\pi \cdot n \cdot 3}{N}} \cdot e^{j\frac{-\pi \cdot n K_{max}}{N}}$$

in addition. It is to be noted that, the positions of the pilot sub-carriers are associated with corresponding OFDM symbols, as shown in FIG. 3. Therefore, the phase shift $$e^{j\frac{2\pi \cdot n\left(a - \frac{K_{max}}{2}\right)}{N}}$$

is performed on the IFFT calculation according to regularity of the pilot sub-carriers in conjunction with a multiplier, so that the sampling points (second number) of the IFFT calculation unit 401 is simplified to N divided by a simplifying parameter, where 'a' is associated with the OFDM symbol index. Deduced from the equations, the phase shift is associated with the first number (N), positions of the pilot sub-carriers corresponding to the OFDM symbols, the regularity (interval D) of the pilot sub-carriers, and the number of available sub-carriers ($K_{max}$+1), i.e., the number of guard bands. The simplifying parameter is equal to 4 in the foregoing equations for example, other numbers can be used provided that the simplifying parameter is divisible by the interval number D of the pilot sub-carriers. For example, in this embodiment value of D, 12, is divisible by 4. Preferably, when the simplifying parameter is n-th power of 2, for example, 2, 4, 8, 16, 32 . . . etc, the IFFT calculation is capable of reducing time needed for conversion. In this embodiment, when N is 8192, the IFFT unit 401 only needs 2048 sampling points to use smaller sizes of buffers and less consumption time than an 8192-sampling-point IFFT unit does, while no additional errors occur.

Figure 6:
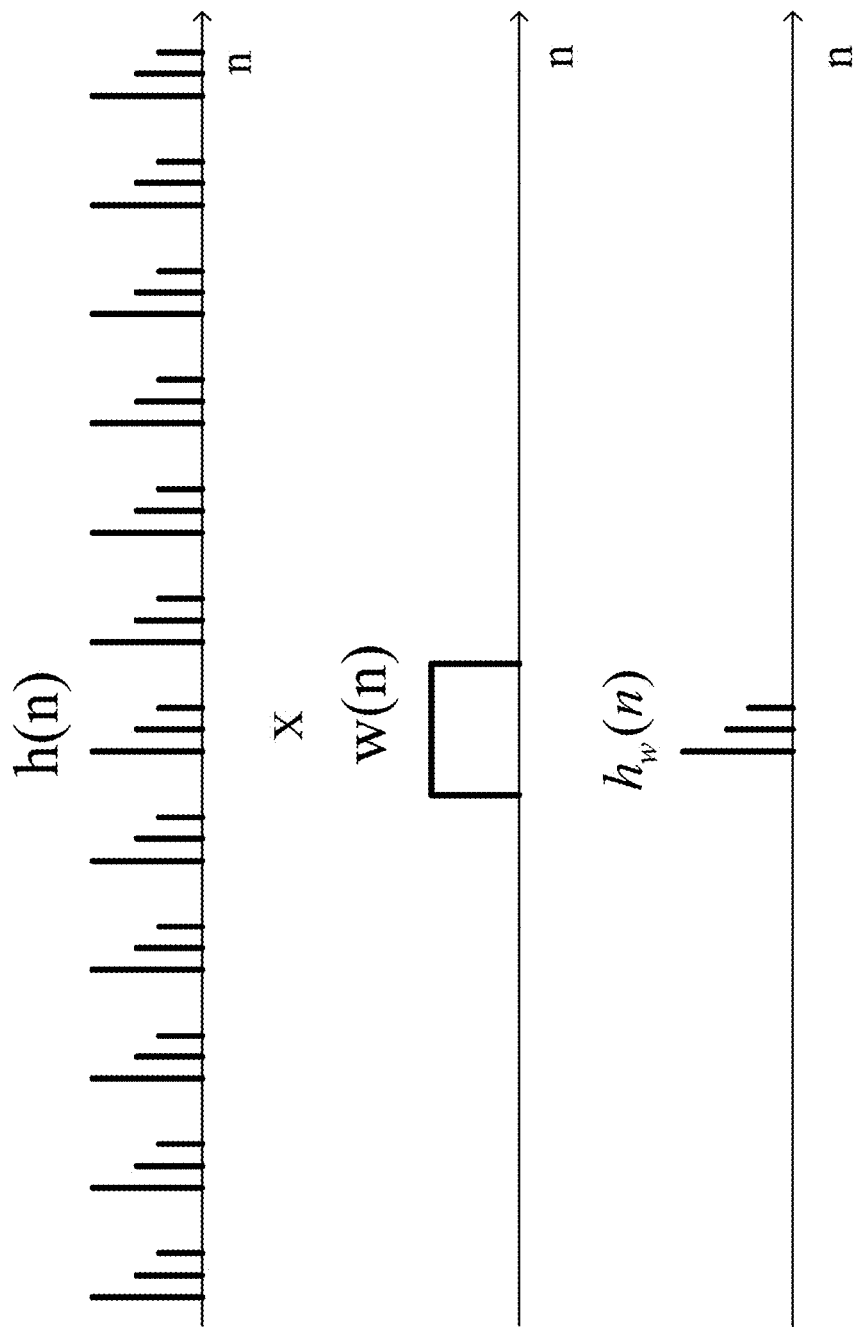
FIG. 6 is a schematic diagram of filtering with time-domain windowing in accordance with an embodiment of the present disclosure.

FIG. 6 shows a schematic diagram illustrating filtering in one embodiment of the present disclosure. Please refer to FIG. 6 and FIG. 4, a filter unit 402 keeps first time-domain channel impulse responses h(n) within a window length to generate second time-domain channel impulse responses $h_w$(h). A time-domain channel impulse response smoothing unit 403 smoothes the second time-domain channel impulse responses $h_w$(h) corresponding to a plurality of different OFDM symbols to generate smoothed time-domain channel impulse responses $h_s$(n). In this embodiment, the second time-domain channel impulse responses $h_w$(n) of 9 consecutive groups of OFDM symbols are taken for calculation. That means, channel impulse responses corresponding to four preceding and four following OFDM symbols of the present OFDM symbol are taken as a base for average or weight of smoothing calculation. For example, the smoothing calculation is represented by $$h_s(n, l) = \sum_{m=-4}^{4} a_m \cdot h_w(n, l-m),$$

where k represents a frequency-domain carrier number, l represents an OFDM symbol, and $a_m$ represents a calculation factor, e.g., $a_m$ is equal to 1/9 in the averaging calculation. In the weighted calculation, channel variance of a time axis is taken into consideration to determine the weight, e.g., a weight of the channel impulse response corresponding to the OFDM symbol to be estimated is higher, and weights of the channel impulse responses corresponding to the OFDM symbols before or after the OFDM symbol to be estimated are lower. It is to be noted that, in this embodiment, the time-domain channel impulse responses, beyond the window length, from the second time-domain channel impulse responses $h_w(n)$, are filtered out via the filter unit 402, therefore it significantly reduces storage unit requirements for buffering inside the smoothing unit 403.

Figure 7:
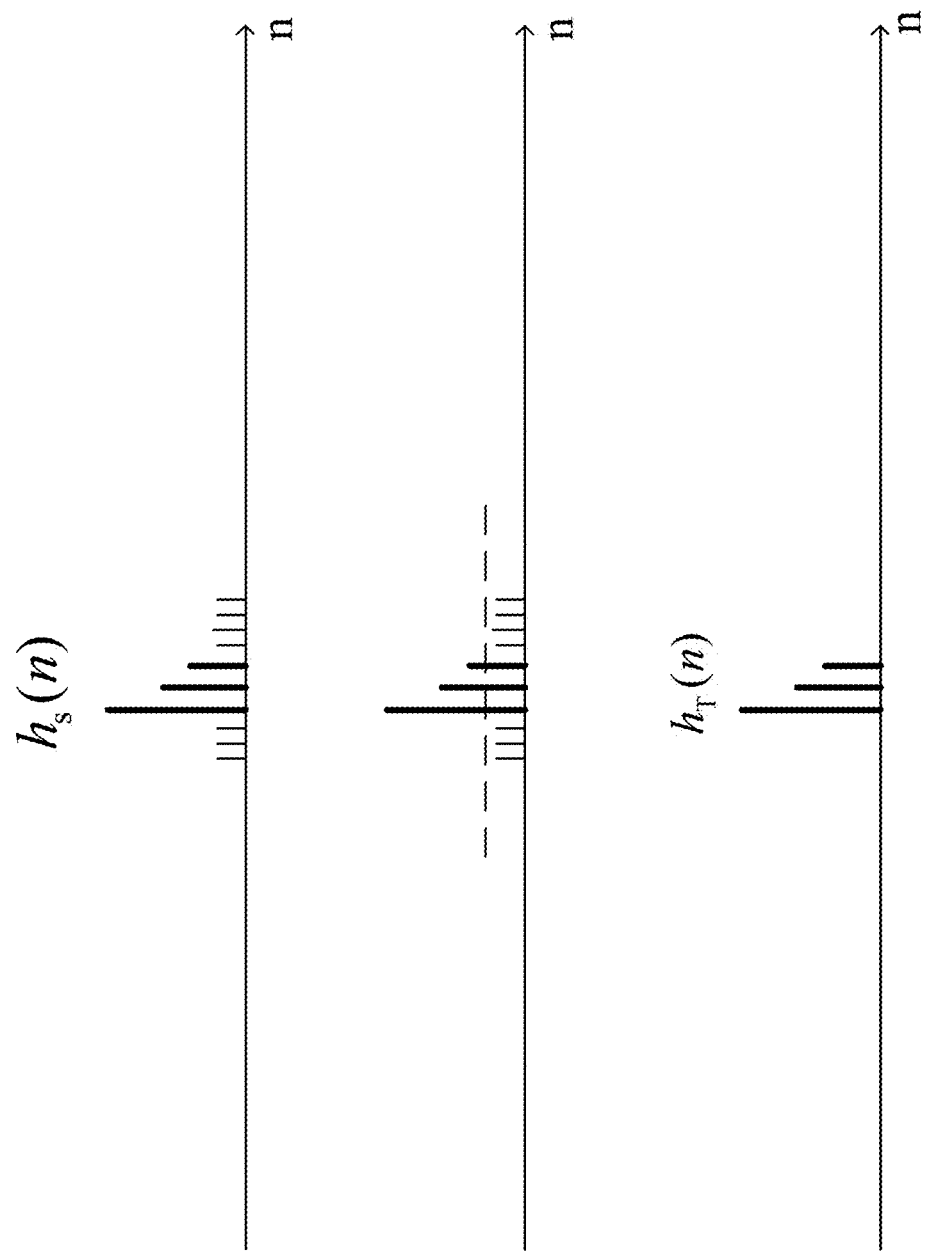
FIG. 7 is a schematic diagram of filtering with a time-domain threshold in accordance with an embodiment of the present disclosure.

FIG. 7 shows a schematic diagram of threshold filtering. Also with reference to FIG. 4, the threshold filter unit 404 stores a threshold value where the filter unit 404 remains smoothed time-domain channel impulse responses $h_s(n)$ having response values higher than the threshold value to generate a third time-domain channel impulse response $h_T(n)$. For example, the threshold value is a weight average of the time-domain channel impulse response values. It is to be noted that, in this embodiment, since the smoothed time-domain channel impulse responses $h_s(n)$ are smoothed by the smoothing unit 403, part of the non-noise response values time-domain channel impulse responses originally lower than the threshold value are enhanced during the smoothing. Therefore, those non-noise response values mentioned above can pass the threshold in filter unit 404. In other words, the smooth process can prevent those non-noise time-domain channel impulse responses from being removed by the filter unit 404. The threshold filter unit 404 is mainly for removing noises, and may also be integrated to the smoothing unit 403 in another embodiment. The FFT unit 405 performs an N-point FFT on the third time-domain channel impulse responses $h_T(n)$ to generate frequency-domain channel responses $\tilde{H}(k)$. In this embodiment, N is equal to 8192, and all sub-carriers of the frequency-domain channel responses $\tilde{H}(k)$ include frequency-domain channel response values, and so data transmitted by data sub-carriers is obtained.

Figure 8:
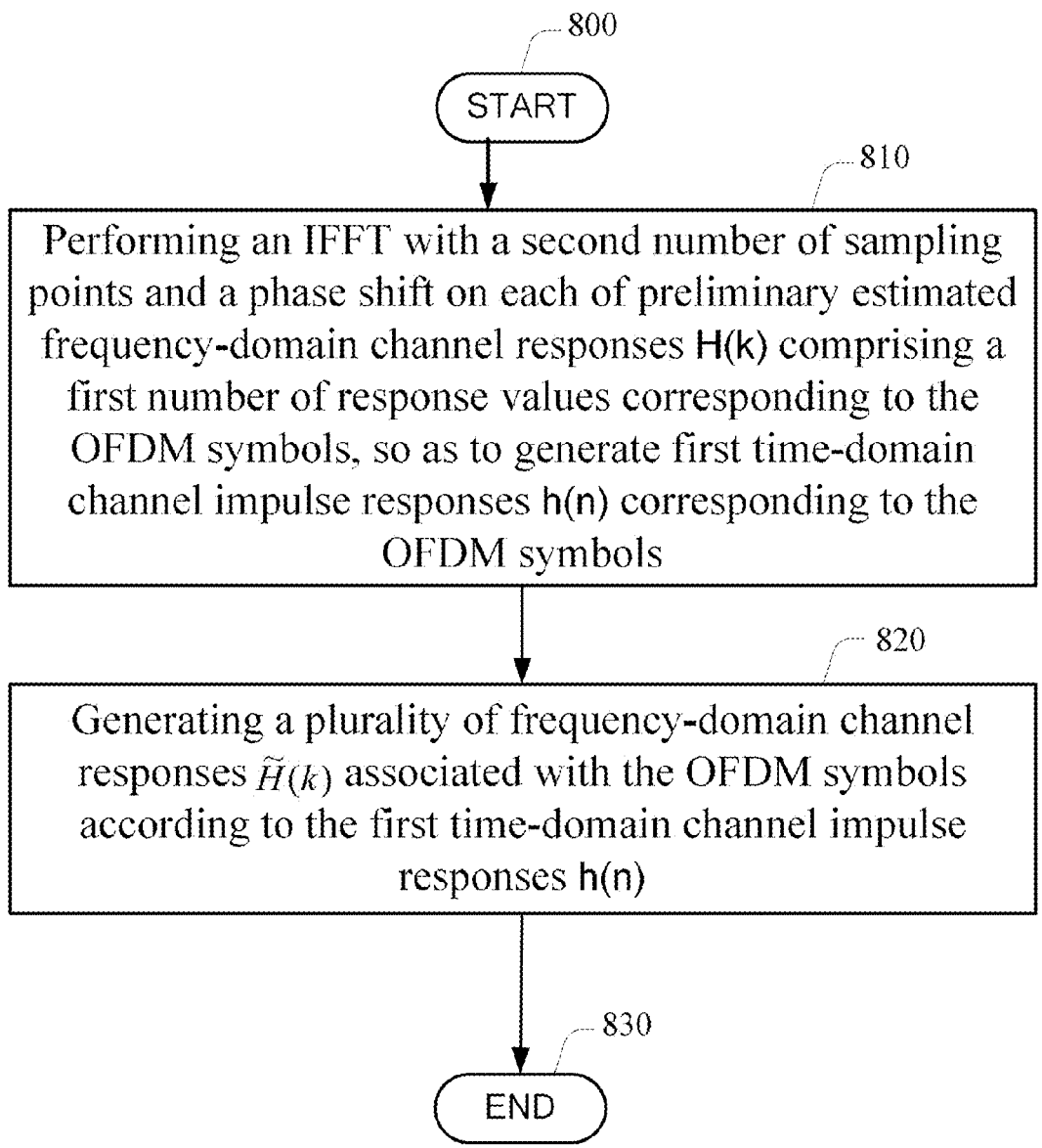
FIG. 8 is a flow chart of channel estimation in accordance with an embodiment of the present disclosure.

FIG. 8 is a flow chart of a channel estimating method in accordance with an embodiment of the present disclosure. The flow starts with Step 800 in which an IFFT with a second number of sampling points and a phase shift is performed on preliminary estimated frequency-domain channel responses H(k) comprising a first number of response values corresponding to a plurality of OFDM symbols, so as to generate first time-domain channel impulse responses h(n) corresponding to the OFDM symbols. In this embodiment, the second number is generated from dividing the first number by a simplifying parameter that divides the first number without leaving a remainder; that is, the first number is the product of the second number, an integer and n-th power of 2. For instance, n-th power of 2 can be 2, 4, 8, 16, 32 . . . etc. Preferably, the simplifying parameter is n-th power of 2, so that the simplified IFFT calculation with the second number of sampling points is suitable for a fast IFFT calculation. The phase shifting in step 810 is to multiply the IFFT result, from calculation of IFFT, with a phase shift $$e^{j\frac{2\pi \cdot n \cdot \left(a - \frac{K_{ma}}{2}\right)}{N}},$$

which is associated with the first number, positions and regularity of pilot sub-carriers corresponding to the OFDM symbols, and the number of unavailable(or available) sub-carriers, i.e., the phase shift is associated with the size of guard bands. For example, in the deduced equations of the foregoing embodiment, the first number is 8092, the simplifying parameter is 4, and the second number is 2048, such that the 2048-sample-point IFFT is capable of achieving channel estimation while it significantly reduces the amount of hardware needed by the IFFT. In Step 820, generating frequency-domain channel responses $\tilde{H}(k)$ associated with the OFDM symbols according to the first time-domain channel impulse responses h(n). The flow ends in Step 830, and at this point, all sub-carriers of the frequency-domain channel responses $\tilde{H}(k)$ are provided with frequency-domain channel response values to complete the channel estimation.

Figure 9:
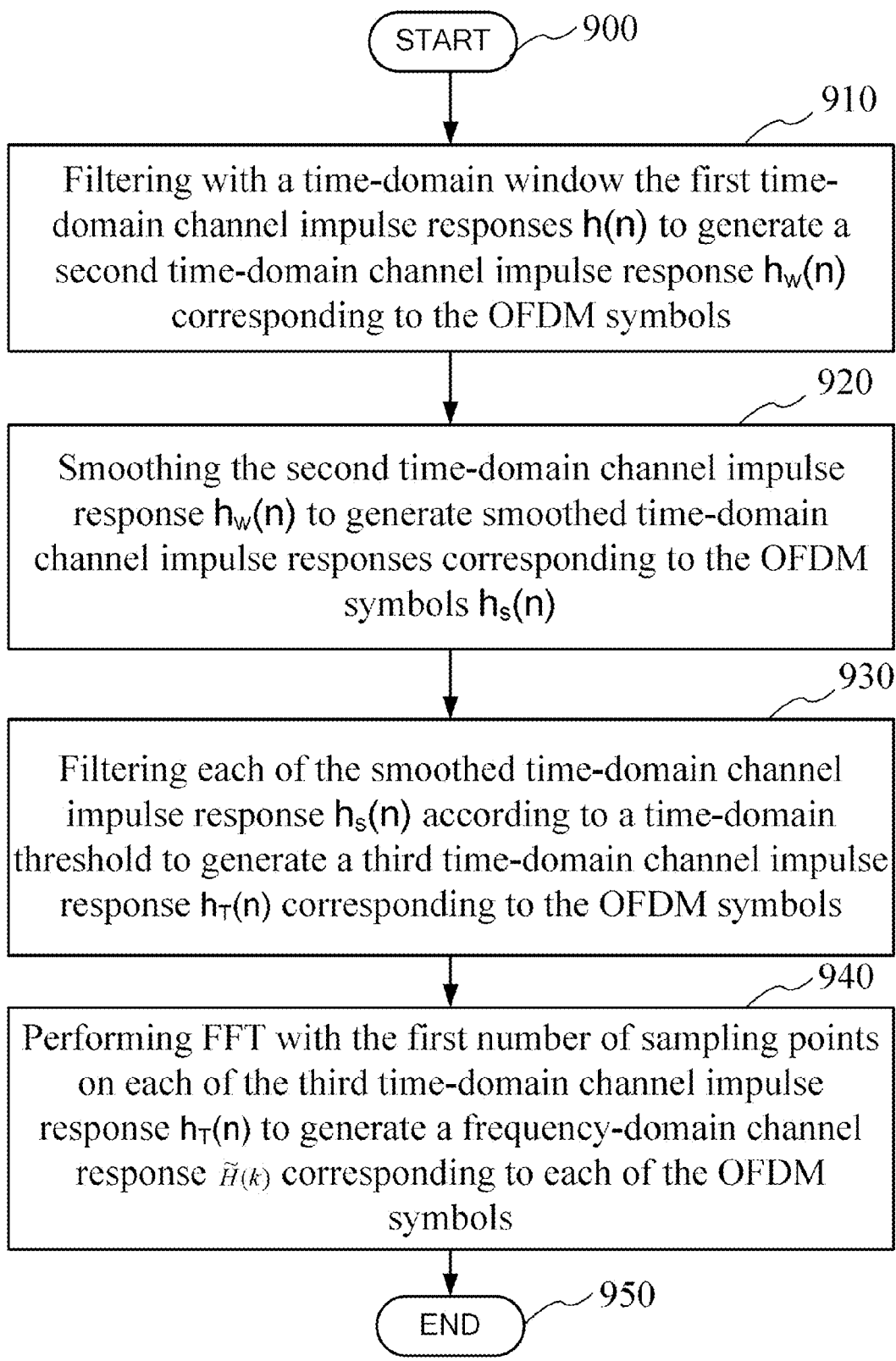
FIG. 9 is a flow chart of generating frequency-domain channel responses in accordance with an embodiment of the present disclosure.

FIG. 9 further depicts a flow chart of generating frequency-domain channel responses in Step 820 of FIG. 8 in accordance with an embodiment of the present disclosure. The flow begins with Step 900. In step 910, performing the step of filtering first time-domain channel impulse responses h(n) according to a time-domain window to generate second time-domain channel impulse responses $h_w(n)$ corresponding to a plurality of OFDM symbols. More specifically, filtering the first time-domain channel impulse responses h(n) according to a time-domain window length to keep the first time-domain channel impulse responses h(n) as the second time-domain channel impulse responses $h_w(n)$. In Step 920, smoothing the second time-domain channel impulse responses I/A to generate smoothed time-domain channel impulse responses $h_s(n)$ corresponding to the OFDM symbols. For example, the smoothing is an averaging calculation or a weighted calculation performed on the second time-domain channel impulse responses $h_w(n)$ corresponding to nine consecutive groups of OFDM symbols, including a channel impulse response of an present OFDM symbol to be estimated, and second time-domain channel impulse responses corresponding to four preceding and four following OFDM symbols of the present OFDM symbol. For example, the smoothing calculation is represented by $$h_s(n, l) = \sum_{m=-4}^{4} a_m \cdot h_w(n, l-m),$$

where k represents a carrier number, l represents an OFDM symbol, $a_m$ represents a weight, e.g., $a_m$ is equal to 1/9 in the averaging calculation. When the weighted calculation is applied, channel variance on the time axis is taken into consideration to determine the weight. When variance in the channel appears to be drastic on the time axis, a weight of a channel impulse response at a time point to be estimated is increased, and weights of channel impulse responses at time points before and after the time point to be estimated are reduced, so that a channel impulse response farther from the time point to be estimated is given a lower weight. It is to be noted that, in this embodiment, before smoothing, filtering the second time-domain channel impulse responses $h_w(n)$ to remove time-domain channel impulse responses beyond the window length of a filter, thereby significantly reducing not only calculation time for smoothing but also storage unit requirements for buffering. In Step 930, filtering the smoothed time-domain channel impulse responses $h_s(n)$ is filtered according to a time-domain threshold to generate third time-domain channel impulse responses $h_T(n)$ corresponding to the OFDM symbols. According to a threshold, the smoothed time-domain channel impulse responses $h_s(n)$ is filtered to keep the smoothed time-domain channel impulse responses $h_s(n)$ with response values higher than the threshold as the third time-domain channel impulse responses $h_T(n)$, e.g., the threshold is a weight average of all the response values of the smoothed time-domain channel impulse responses $h_s(n)$. In Step 940, performing an FFT with a first number of sampling points on the third time-domain channel impulse responses $h_T(n)$ to generate frequency-domain channel impulse responses $\tilde{H}(k)$ corresponding to the OFDM symbols. In this embodiment, the first number is 8192, the frequency-domain channel impulse responses $\tilde{H}(k)$ comprise the same number of frequency-domain channel responses as preliminary estimated frequency-domain channel responses $H(k)$, i.e., the frequency-domain channel impulse responses $\tilde{H}(k)$ are generated at all positions of sub-carriers corresponding to k within a range of 0 to 8191. The flow ends in Step 950.

According to the foregoing description of embodiments, a low-cost channel estimating apparatus and a method thereof with low calculation complexity and low power consumption are provided by the present disclosure to overcome disadvantages in the prior art. The present disclosure is not limited to the described embodiments, and modifications on arrangements of pilot sub-carriers, sampling points, averaging groups, approaches for smoothing, and the like, are within the spirit and scope of the present disclosure.

In conclusion, a channel estimating apparatus, provided by the present disclosure and applied to an OFDM system, comprises an IFFT unit, a filter unit, a smoothing unit, and an FFT unit. The IFFT unit performs an IFFT with a second number of sampling points on preliminary estimated frequency-domain channel responses comprising a first number of response values corresponding to a plurality of OFDM symbols, so as to generate a plurality of first time-domain channel impulse responses corresponding to the OFDM symbols, wherein the first number is greater than the second number. The filter unit filters the first time-domain channel impulse responses with a time-domain window to generate a plurality of second time-domain channel impulse responses corresponding to the OFDM symbols. The smoothing unit smoothes the plurality of second time-domain channel impulse responses to generate a plurality of smoothed time-domain channel impulse responses corresponding to the OFDM symbols. The FFT unit performs an FFT with the first number of sampling points on the smoothed time-domain channel impulse responses to generate a plurality of frequency-domain channel responses corresponding to the OFDM symbols.

According to the present disclosure, a channel estimating method, applied to an OFDM communication system and for receiving a plurality of OFDM symbols, comprises performing an IFFT with a second number of sampling points and a phase shift on preliminary estimated frequency-domain channel impulse responses comprising a plurality of response values corresponding to the OFDM symbols in order to generate first time-domain channel impulse responses corresponding to the OFDM symbols, wherein the first number is greater than the second number; and, according to the first time-domain channel impulse responses, generating a plurality of frequency-domain channel responses corresponding to the OFDM symbols.

According to the present disclosure, an IFFT unit for channel estimation of an OFDM communication system comprises an IFFT converter and a phase shift multiplier. The IFFT converter performs an IFFT with a second number of sampling points on a preliminary estimated frequency-domain channel response comprising a first number of response values to generate an IFFT result, wherein the first number is greater than the second number. The phase shift multiplier performs a phase shift on the IFFT result to generate a time-domain channel impulse response.

While the disclosure has been described in terms of what is presently considered to be the most practical and preferred embodiments, it is to be understood that the present disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A channel estimating apparatus, applied to a data communication system using an Orthogonal Frequency-Division Multiplexing (OFDM) modulation, the data communication system receiving data in the form of a plurality of OFDM symbols, the channel estimating apparatus comprising: an Inverse Fast Fourier Transform (IFFT) unit, that performs IFFT on each of a plurality of preliminary estimated frequency-domain channel responses corresponding to the OFDM symbols received from a transmitter, with a second number of sampling points, to generate a plurality of first time-domain channel impulse responses corresponding to the OFDM symbols, each of the preliminary estimated frequency-domain channel responses having a first number of response values, the first number being greater than the second number such that calculation complexity and size of the IFFT unit are reduced; a filter unit, that filters by a time-domain window the first time-domain channel impulse responses to generate a plurality of second time-domain channel impulse responses corresponding to the OFDM symbols; a smoothing unit, that smoothes the second time-domain channel impulse responses to generate a plurality of smoothed time-domain channel impulse responses that are corresponding to the OFDM symbols and time variance of a channel; and a Fast Fourier Transform (FFT) unit, that performs FFT with the first number of sampling points on each smoothed time-domain channel impulse response to generate a plurality of frequency-domain channel impulse responses corresponding to the OFDM symbols, wherein the IFFT unit comprises a multiplier that performs a phase shift on the preliminary estimated frequency-domain channel responses corresponding to the OFDM symbols to generate the first time-domain channel impulse responses.

2. The apparatus as claimed in claim 1, wherein the second number is derived by dividing the first number by a simplifying parameter.

3. The apparatus as claimed in claim 1, wherein the first number is a product of the second number, an integer, and an n-th power of 2, wherein n is a positive integer.

4. The apparatus as claimed in claim 1, wherein the OFDM symbols have at least a plurality of data symbols with a plurality of pilot symbols, and wherein the second number is determined according to a characteristic of the pilot symbols.

5. The apparatus as claimed in claim 1, wherein the OFDM symbols have a plurality of data symbols with a plurality of pilot symbols and at least one guard band, and wherein the phase shift is associated with the first number, a regularity of the plurality of pilot symbols, and the guard band.

6. The apparatus as claimed in claim 1, wherein the filter unit has a time-domain window length where the second time-domain channel impulse responses are kept within the window length.

7. The apparatus as claimed in claim 1, wherein the smoothing unit smoothes the second time-domain channel impulse responses by an averaging calculation or a weighted calculation.

8. The apparatus as claimed in claim 1, wherein the smoothing unit further comprises a threshold filter unit that performs time-domain threshold filtering to generate the smoothed time-domain channel impulse responses.

9. A channel estimating method applied to an Orthogonal Frequency-Division multiplexing (OFDM) communication system which receives a plurality of OFDM symbols, the method comprising: performing Inverse Fast Fourier Transform (IFFT) and a phase shift on each of a plurality of preliminary estimated frequency-domain channel responses corresponding to the OFDM symbols received from a transmitter, each preliminary estimated frequency-domain channel response having a first number of response values, with a second number of sampling points, to generate a plurality of first time-domain channel impulse responses corresponding to the OFDM symbols, the first number being greater than the second number such that calculation complexity of the IFFT is reduced; and generating a plurality of frequency-domain channel responses associated with the OFDM symbols according to the first time-domain channel impulse responses, wherein generating the frequency-domain channel responses comprises: filtering with a time-domain window having a time-domain window length the first time-domain channel impulse responses to generate a plurality of second time-domain channel impulse responses corresponding to the OFDM symbols; smoothing each of the second time-domain channel impulse responses to generate smoothed time-domain channel impulse responses corresponding to the OFDM symbols and time variance of a channel; filtering each of the smoothed time-domain channel impulse responses according to a time-domain threshold to generate a plurality of third time-domain channel impulse responses corresponding to the OFDM symbols; and performing FFT with the first number of sampling points on each of the third time-domain channel impulse responses to generate a plurality of frequency-domain channel responses corresponding to the OFDM symbols.

10. The channel estimating method as claimed in claim 9, wherein performing the phase shift comprises phase shifting results of the IFFT with the second number of sampling points, and wherein the phase shift is associated with the first number, a regularity of a plurality of pilot symbols corresponding to the OFDM symbols, and a guard band.

11. The channel estimating method as claimed in claim 9, further comprising deriving the second number by dividing the first number by a simplifying parameter.

12. The channel estimating method as claimed in claim 9, wherein filtering with the time-domain window having a time-domain window length comprises keeping the second time-domain impulse responses within the time-domain window length.

13. The channel estimating method as claimed in claim 9, wherein smoothing comprises performing an averaging calculation or a weighted calculation.

14. The channel estimating method as claimed in claim 9, wherein filtering comprises keeping at least part of the smoothed time-domain channel impulse responses with response values higher than the time-domain threshold to generate the third time-domain channel impulse responses.

15. The channel estimating method as claimed in claim 14, wherein the time-domain threshold is a weight average of the response values of the smoothed time-domain channel impulse responses.

16. An apparatus for channel estimation in an Orthogonal Frequency-Division Multiplexing (OFDM) communication system, the apparatus comprising: an inverse fast Fourier transform (IFFT) converter, that performs, with a second number of sampling points, IFFT on a plurality of preliminary estimated frequency-domain channel responses corresponding to OFDM symbols from a transmitter to generate an IFFT result, the preliminary estimated frequency-domain channel responses having a first number of response values, the first number being greater than the second number such that calculation complexity and size of the IFFT converter are reduced; a phase shift multiplier, that performs a phase shift on the IFFT result to generate a time-domain channel impulse response; and a Fast Fourier Transform (FFT) unit, that performs FFT with the first number of response values on each time-domain channel impulse response to generate a plurality of frequency-domain channel impulse responses corresponding to the OFDM symbols, wherein the FFT unit generates the frequency-domain channel responses by performing operations comprising: filtering with a time-domain window having a time-domain window length the first time-domain channel impulse responses to generate a plurality of second time-domain channel impulse responses corresponding to the OFDM symbols; smoothing each of the second time-domain channel impulse responses to generate smoothed time-domain channel impulse responses corresponding to the OFDM symbols and time variance of a channel; filtering each of the smoothed time-domain channel impulse responses according to a time-domain threshold to generate a plurality of third time-domain channel impulse responses corresponding to the OFDM symbols; and performing FFT with the first number of sampling points on each of the third time-domain channel impulse responses to generate a plurality of frequency-domain channel responses corresponding to the OFDM symbols.

17. The apparatus as claimed in claim 16, wherein the first number is the product of the second number, an integer, and an n-th power of 2, wherein n is a positive integer.

18. The apparatus as claimed in claim 16, wherein the phase shift is associated with the first number, a regularity of a plurality of pilot symbols, and a guard band.

* * * * *